United States Patent Office 3,655,898
Patented Apr. 11, 1972

3,655,898
USE OF PYRIDYLTHIURONIUM SALTS AS FUNGICIDES
Patrick R. Driscoll, Spotswood, N.J., assignor to Mobil Oil Corporation
No Drawing. Filed June 30, 1969, Ser. No. 837,948
Int. Cl. A01n 9/00
U.S. Cl. 424—263                6 Claims

ABSTRACT OF THE DISCLOSURE

Certain pyridylthiuronium halide salts substituted in the 2- or 4-position with the thiuronium halide substituent form a new class of fungicides. They are highly effective as spore fungicides against *Monilinia fructicola* and *Stemphylium sarcinaeforme*. They also are highly effective as soil fungicides against *Fusarium oxysporium, Pythium debaryanum, Rhizoctonia solani,* and *Sclerotium rolfsii*.

BACKGROUND OF THE INVENTION

Field of the invention

This invention is directed to the novel use of pyridylthiuronium halide salts as fungicides. It is more particularly concerned with the use of non-, mono-, di-, or trisubstituted pyridyl rings with a thiuronium halide substituent at either the 2- or 4-position.

Description of prior art

It is known to those skilled in the art that certain pyridylthiuronium salts perform as bactericides (S. J. DeCourey, Jr. and F. E. Reinhart, J. Franklin Inst., 260, 143–5 (1955)).

SUMMARY OF THE INVENTION

This invention provides a method for combatting fungi which comprises contacting the fungi with at least one compound having the formula:

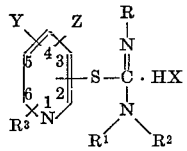

wherein

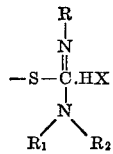

may be in either the 2- or 4-position, and wherein X is halogen, Y and Z are the same or different and are chosen from hydrogen, $NO_2$, NO, CN, SCN, alkoxy ($C_1$–$C_4$), alkylthio ($C_1$–$C_4$), halogen, COOH, $CO_2R$,

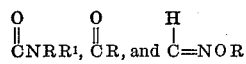

and R, $R^1$, $R^2$, and $R^3$ are the same or different and are chosen from hydrogen, alkyl ($C_1$–$C_4$), cycloalkyl, aryl, and substituted aryl.

DESCRIPTION OF SPECIFIC EMBODIMENTS

As will be noted from the formula the compounds used in this invention have a non-, mono-, di- or trisubstituted pyridyl ring with a thiuronium halide radical substituted at either the 2- or 4-position. Non-limiting examples of the compounds used in this invention include:

S-(3,5-dinitro-2-pyridyl) thiuronium chloride;
S-(5-nitro-2-pyridyl) thiuronium chloride;
S-(5-nitro-2-pyridyl) methylthiuronium chloride;
S-(3,5-dinitro-2-pyridyl) thiuronium bromide;
S-(3,5-dinitro-2-pyridyl) methylthiuronium bromide;
S-(5-nitro-2-pyridyl) thiuronium bromide;
S-(3,5-dinitro-2-pyridyl) thiuronium fluoride;
S-(5-nitro-2-pyridyl) thiuronium fluoride;
S-(3,5-dinitro-2-pyridyl) methylthiuronium fluoride;
S-(5-chloro-2-pyridyl) thiuronium chloride;
S-(5-bromo-2-pyridyl) thiuronium chloride;
S-(5-formyl-2-pyridyl) thiuronium chloride;
S-(3,5-dinitro-6-methyl-2-pyridyl)-1,1,3-trimethyl-thiuronium chloride;
S-(3,5-dinitro-2-pyridyl)-1,3-dimethylthiuronium chloride;
S-(5-nitro-2-pyridyl) ethylthiuronium chloride;
S-(5-nitro-2-pyridyl)-1-methyl-3-ethylthiuronium chloride;
S-(5-nitro-2-pyridyl) phenylthiuronium chloride;
S-(5-nitro-6-methyl-2-pyridyl) phenylthiuronium chloride;
S-(5-acetyl-2-pyridyl) thiuronium chloride;
S-(5-nitro-2-pyridyl) cyclobutylthiuronium chloride;
S-(3,5-dinitro-6-methyl-2-pyridyl) thiuronium chloride;
S-(5-cyano-2-pyridyl) thiuronium chloride;
S-(5-thiocyano-2-pyridyl) thiuronium chloride;
S-(5-carboxy-2-pyridyl) thiuronium chloride;
S-(5-carboxy-3-nitro-2-pyridyl) methylthiuronium chloride;
S-(2,6-dinitro-4-pyridyl) thiuronium chloride;
S-(2-nitro-4-pyridyl) thiuronium chloride;
S-(2-nitro-4-pyridyl) methylthiuronium chloride;
S-(2,6-dinitro-4-pyridyl) thiuronium bromide;
S-(2,6-dinitro-4-pyridyl) methylthiuronium bromide;
S-(2-nitro-4-pyridyl) thiuronium bromide;
S-(2,6-dinitro-4-pyridyl) thiuronium fluoride;
S-(2-nitro-4-pyridyl) thiuronium fluoride;
S-(2,6-dinitro-4-pyridyl) methylthiuronium fluoride;
S-(2-chloro-4-pyridyl) thiuronium chloride;
S-(2-bromo-4-pyridyl) thiuronium chloride;
S-(2-formyl-4-pyridyl) thiuronium chloride;
S-(2,6-dinitro-4-pyridyl)-1,3-dimethylthiuronium chloride;
S-(2-nitro-4-pyridyl) ethylthiuronium chloride;
S-(2-nitro-4-pyridyl) phenylthiuronium chloride;
S-(2-nitro-6-methyl-4-pyridyl) phenylthiuronium chloride;
S-(2-nitro-4-pyridyl) cyclobutylthiuronium chloride;
S-(2-pyridyl) thiuronium chloride;
S-(2-pyridyl) thiuronium bromide;
S-(2-pyridyl) methylthiuronium chloride; and
S-(2-pyridyl) methylthiuronium bromide.

The compounds used in this invention are readily prepared by the general procedure: An appropriate halogenated non-, mono-, di-, or trisubstituted (e.g. nitro) pyridine is mixed with an appropriate thiourea and slurried in an alcohol, such as absolute ethanol. The slurry is heated to an elevated temperature for a period of time, then cooled. The solid pyridylthiuronium halide product is then collected by filtration. The following examples demonstrate the typical procedures.

EXAMPLE 1

S-(3,5-dinitro-2-pyridyl) thiuronium chloride 10.0 g. of 2-chloro-3,5-dinitropyridine was slurried with 3.8 g. of thiourea in 75 ml. of absolute ethanol. The slurry was heated to 80° C. for one hour, cooled to 10° C., and then filtered to yield 10.4 g. of yellow solid product which had a decomposition point of 180° C.

EXAMPLE 2

S-(5-nitro-2-pyridyl) thiuronium chloride 30.0 g. of 2-chloro-5-nitropyridine was slurried and reacted with 15.0 g. of thiourea as in the above example to yield 28.8 g. of yellow solid product which had a decomposition point of 181–185° C. This compound was confirmed by elemental analysis to contain 24.06% nitrogen. The theoretical nitrogen content by calculation is 23.87%.

EXAMPLE 3

S-(5-nitro-2-pyridyl) methylthiuronium chloride 7.0 g. f 2-chloro-5-nitropyridine was slurried and reacted with 4.1 g. of methylthiourea as in the above examples to yield 5.0 g. of yellow solid product which had a decomposition point of 173–174° C.

EXAMPLE 4

S-(3,5-dinitro-2-pyridyl) thiuronium bromide 5.0 g. of 2-bromo-3,5-dinitropyridine was slurried and reacted with 1.5 g. of thiourea as in the above examples to yield 2.7 g. of orange solid product which had a decomposition point of 236–238° C.

EXAMPLE 5

S-(3,5-dinitro-2-pyridyl) methylthiuronium bromide 6.0 g. of 2-bromo-3,5-dinitropyridine was slurried and reacted with 2.2 g. of methylthiourea as in the above examples to yield 1.0 g. of yellow solid product which had a decomposition point of 220° C.

The compounds of the examples were subjected to the following fungicidal tests. The results are set forth in the table following the test description.

FUNGICIDE TESTING METHODS

Spore germination test

Fungus species Monilinia fructicola and Stemphylium sarcinaeforme are cultured on potato dextrose agar and oat agar, respectively, at room temperature under continuous fluorescent light. Spores growing in 90 mm. petri dishes containing 40 ml. of the respective agar medium are ready for testing after one week.

Spores are obtained by scraping them from the surface of the cultures with a rubber policeman or bacterial loop and washing them free with distilled water. The spores in suspension are filtered through a thin layer of glass wool to remove bits of mycelium, and freed of soluble extraneous materials by centrifuging and resuspending in distilled water. The spore concentration is adjusted to 10,000 per ml. using a Fuchs-Rosenthal counting chamber.

One hundred mg. of each test compound is weighed into a 4-dram wide-mouth vial and dissolved in 10 ml. of a volatile solvent (usually acetone) giving a 10,000 p.p.m. concentration. A 50 p.p.m. concentration is prepared by serial dilution.

Two-tenths ml. of the 50 p.p.m. solution is placed in the well of a hollow-ground depression slide. One slide is prepared for each fungus organism. The volatile solvent is allowed to evaporate (15 minutes for acetone) leaving a deposit of the toxicant. Two-tenths ml. of the spore suspension with a stimulant solution is then added to each slide.

Slides are then placed in large, inverted glass moisture chambers on metal holding racks and the chambers are sealed with water to maintain a high relative humidity of near 100%. Chambers are held at constant room temperature near 24° C.

After sixteen hours, results are taken by counting the number of spores germinating per 50 spores from each of the two slides treated with the compound. The number failing to germinate is recorded as percent spore germination inhibition.

Soil test

Four representative soil fungi, Fusarium oxysporium, Pythium debaryanum, Rhizoctonia solani and Sclerotium rolfsii, are maintained on potato dextrose agar in 20 x 150 mm. test tubes. Inoculum for the test is increased in a 1000 ml. Erlenmeyer flask on a ¼ corn meal–¾ sand mixture (by volume). The medium is saturated with water and sterilized by autoclaving at 15 lbs. pressure for 20 minutes on two successive days. The medium is inoculated by transferring, aseptically, a small portion of mycelium from the test tube cultures 14 days prior to using for inoculum.

An inoculated medium for each of the four soil organisms is prepared as follows: A 14 day old 1000 ml. flask of the corn meal-sand inoculum is used to inoculate 20 10 oz. cups of sterile soil by blending the inoculum and sterile soil for 10 minutes in the cement mixer.

The inoculated medium is then placed in 10 oz. wax treated cold drink cups (20 cups of each organism) and treated as follows: 150 mg. quantity of each candidate fungicide is weighed on the analytical balance and formulated using 10 ml. of acetone and 190 ml. of $H_2O$. If the compound is insoluble in acetone or water, 1.1 g. of Continental Clay, .1 g. of Marasperse N and 2 g. of Petro-BP is added and the mixture ground in the Waring Blendor for 3 minutes. A 50 ml. quantity of each chemical formulation is used to drench 1 cup inoculated with each of the four fungal organisms. Immediately after the cups are drenched, they are placed in polyethylene bags (1 cup per bag) and held at 70° F. for fourteen days.

After ten days, each cup is examined for the presence of fungal growth and each compound rated for percent inhibition of fungal growth.

TABLE.—FUNGICIDAL ACTIVITY [1] OF PYRIDYL THIURONIUM SALTS

| Compound of example: | Concentration of compound, p.p.m. | Percent inhibition of fungal spore germination of | | Percent inhibition of fungal growth of | | | |
|---|---|---|---|---|---|---|---|
| | | Monilinia fructicola | Stemphylium sarcinaeforme | Fusarium oxysporium | Pythium debaryanum | Rhizoctonia solani | Sclerotium rolfsii |
| 1 | 50 | 100 | 100 | 0 | 0 | 0 | 0 |
| | 10 | 100 | 100 | | | | |
| | 1 | 100 | 0 | | | | |
| 2 | 50 | 60 | 30 | 100 | 100 | 100 | 100 |
| | 25 | | | 0 | 0 | 0 | 0 |
| 3 | 50 | 100 | 60 | 0 | 100 | 100 | 100 |
| | 25 | | | | 100 | 100 | 70 |
| | 10 | 40 | 0 | | | | |
| 4 | 50 | 100 | 100 | | | | |
| 5 | 50 | 100 | 100 | 0 | 60 | 0 | 0 |
| | 10 | 80 | 0 | | | | |

[1] Fungicidal activity is measured in percent effectiveness.

From the data in the table, it will be noted that the pyridylthiuronium halide salts used in this invention have a broad range of fungicidal activity. One compound, that of Example 1, is 100% effective as a spore germination inhibitor against *Monilinia fructicola* at only 1 p.p.m. fungicidal concentration. It is 100% effective against *Stemphylium sarcinaeforme* at 10 p.p.m. Many of the compounds used in this invention are 100% effective at 50 p.p.m. against the majority of both soil and spore fungus forms.

The compounds may be used in this invention in various ways to achieve fungicidal action. They can be applied as dusts, as liquid sprays, or as gas-propelled sprays, and can contain, in addition to a carrier, additives such as emulsifying agents, wetting agents, binding agents, gases compressed to the liquid state, odorants, stabilizers and the like. A wide variety of liquid and solid carriers can be used in the fungicidal compositions. Non-limiting examples of liquid carriers include water; organic solvents, such as alcohols, ketones, amides, and esters; mineral oils, such as kerosene, light oils, and medium oils; and vegetable oils, such as cottonseed oil. Non-limiting examples of solid carriers include talc, bentonite, diatomaceous earth, pyrophyllite, fuller's earth, gypsum, flours derived from cotton seeds and nut shells, and various natural and synthetic clays having a pH not exceeding about 9.5.

In order to achieve a broader spectrum of control, it is within the contemplation of this invention to include two or more pyridylthiuronium halide salt derivatives in the fungicidal composition. The amount of the derivatives used in the fungicidal compositions will vary rather widely. It depends to some extent upon the type of composition in which the material is being used, the nature of the condition to be controlled, and the method of application. In the ultimate fungicidal composition, as applied in the field, fungicide concentrations as low as 0.0001 weight percent of the total composition can be used. In general, compositions, as applied, containing about 0.0005 weight percent fungicide in either liquid or solid carrier, give good results. In some cases, however, stronger dosages up to about one weight percent may be required.

In practice, fungicidal compositions are usually prepared in the form of concentrates, which are diluted in the field to the concentration desired for application. For example, the concentrate can be a wettable powder containing large amounts of fungicide, a carrier (e.g., attapulgite or other clay), and wetting and dispersing agents. Such powders can be diluted prior to application by dispersing them in water to obtain a sprayable suspension containing the concentration of fungicide desired for application. Other concentrates can be solutions that can be later diluted, e.g. with kerosene. Thus, it is within the contemplation of this invention to provide fungicidal compositions containing up to about 80 percent, by weight of the composition, of fungicide. Accordingly, depending upon whether it is ready for application or it is in concentrated form, the contemplated fungicidal compositions contain between about 0.0001 percent and 80 percent, by weight of the composition of at least one fungicidal pyridylthiuronium salt derivative and a carrier, liquid or solid, as defined hereinbefore.

Although the present invention has been described with preferred embodiments, it is to be understood that modifications and variations may be resorted to, without departing from the spirit and scope of this invention, as those skilled in the art will readily understand.

What is claimed is:

1. A method for combatting fungi which comprises contacting the fungi with a fungicidally effective amount of a compound of the formula:

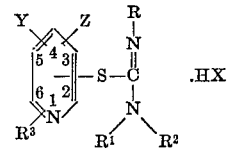

wherein

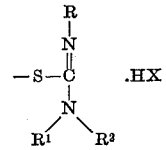

is in the 2-position, and wherein X is a member selected from the group consisting of fluorine, chlorine and bromine, Y and Z are the same or different and are members selected from the group consisting of hydrogen, $NO_2$, CN, SCN, chlorine, bromine, COOH, acetyl and formyl, and R, $R^1$, $R^2$ and $R^3$ are the same or different and are members selected from the group consisting of hydrogen, alkyl of 1–4 carbon atoms, cyclobutyl and phenyl.

2. The method of claim 1, wherein said compound is S-(3,5-dinitro-2-pyridyl)thiuronium chloride.

3. The method of claim 1, wherein said compound is S-(5-nitro-2-pyridyl)thiuronium chloride.

4. The method of claim 1, wherein said compound is S-(5-nitro-2-pyridyl)methylthiuronium chloride.

5. The method of claim 1, wherein said compound is S-(3,5-dinitro-2-pyridyl)thiuronium bromide.

6. The method of claim 1, wherein said compound is S-(3,5-dinitro-2-pyridyl)methylthiuronium bromide.

References Cited

UNITED STATES PATENTS

| | | | |
|---|---|---|---|
| 2,923,656 | 2/1960 | Hackmann | 424—326 |
| 2,980,578 | 4/1961 | Abramitis et al. | 424—326 |
| 3,513,197 | 5/1970 | Daum et al. | 424—326 |

FOREIGN PATENTS

| | | | |
|---|---|---|---|
| 889,002 | 2/1962 | Great Britain | 424—263 |

OTHER REFERENCES

Journal Franklin Inst., 263, 557–8 (1957), DeCourey, Jr. et al.

ALBERT T. MEYERS, Primary Examiner

F. E. WADDELL, Assistant Examiner